US010334412B1

(12) United States Patent
Kenane

(10) Patent No.: US 10,334,412 B1
(45) Date of Patent: Jun. 25, 2019

(54) AUTONOMOUS VEHICLE ASSISTANCE SYSTEMS

(71) Applicant: Boaz Kenane, Portland, OR (US)

(72) Inventor: Boaz Kenane, Portland, OR (US)

(*) Notice: Subject to any disclaimer, the term of this patent is extended or adjusted under 35 U.S.C. 154(b) by 25 days.

(21) Appl. No.: 15/865,483

(22) Filed: Jan. 9, 2018

(51) Int. Cl.
G05D 1/00 (2006.01)
H04W 4/44 (2018.01)
B60W 40/06 (2012.01)
G08G 1/0967 (2006.01)

(52) U.S. Cl.
CPC .............. *H04W 4/44* (2018.02); *B60W 40/06* (2013.01); *G05D 1/0088* (2013.01); *G08G 1/096708* (2013.01); *G08G 1/096783* (2013.01); *B60W 2550/12* (2013.01); *B60W 2550/402* (2013.01)

(58) Field of Classification Search
CPC ....... G08G 1/096741; G08G 1/096783; G08G 1/164; G08G 1/0116; G08G 1/0133; G08G 1/096725; G08G 1/096791; G08G 1/04; G08G 1/166
See application file for complete search history.

(56) References Cited

U.S. PATENT DOCUMENTS

| 7,477,988 | B2 | 1/2009 | Dorum |
| 7,737,832 | B2 | 6/2010 | Baratoff et al. |
| 8,576,069 | B2 | 11/2013 | Nadeem et al. |
| 8,825,350 | B1 | 9/2014 | Robinson |
| 9,043,072 | B1* | 5/2015 | Tisdale .................. G05D 1/021 701/28 |
| 9,134,133 | B2 | 9/2015 | Denaro |
| 9,349,285 | B1 | 5/2016 | Fowe |
| 9,586,581 | B2 | 3/2017 | Strauss et al. |
| 9,600,768 | B1 | 3/2017 | Ferguson |
| 9,666,072 | B2 | 5/2017 | Fowe et al. |
| 2014/0063196 | A1* | 3/2014 | Daniel ..................... G08G 1/04 348/46 |
| 2015/0134232 | A1 | 5/2015 | Robinson |
| 2017/0129491 | A1* | 5/2017 | Tatourian ............ B60W 30/143 |

\* cited by examiner

*Primary Examiner* — Omeed Alizada
(74) *Attorney, Agent, or Firm* — Mohr Intellectual Property Law Solutions, P.C.

(57) ABSTRACT

Apparatuses and methods of operating the same are described. A sensor system including a sensor, a processor, and a communication subsystem. The sensor may measure a defined area of a path located below the sensor system to obtain a sensor measurement. The processor may be coupled to the sensor. The processor may determine at least one of environmental condition information within the defined area or characteristic information associated with an object within the defined area using the sensor measurement. The communication subsystem may be coupled to the processor. The communication subsystem may send at least one of the environmental condition information or the characteristic information to a communication system of a vehicle.

20 Claims, 7 Drawing Sheets

AUTONOMOUS VEHICLE ASSISTANCE SYSTEMS

CROSS-REFERENCE TO RELATED APPLICATION

This application claims the benefit of U.S. Provisional Application No. 62/637,732, filed Feb. 27, 2017.

BACKGROUND

Autonomous vehicles are configured to navigate through an environment with little or no input from a driver. An autonomous vehicle may include multiple sensors that take scene measurements within an area surrounding the autonomous vehicle. The autonomous vehicle may use information from the environmental measurements to navigate through the environment, avoid collisions, and efficiently reach a destination. For example, if a processor uses a sensor to identify the vehicle is approaching an obstacle, the autonomous vehicle may navigate around the obstacle to avoid a collision.

SUMMARY

A sensor system including a sensor, a processor, and a communication subsystem. The sensor may measure a defined area of a path located below the sensor system to obtain a sensor measurement. The processor may be coupled to the sensor. The processor may determine at least one of environmental condition information within the defined area or characteristic information associated with an object within the defined area using the sensor measurement. The communication subsystem may be coupled to the processor. The communication subsystem may send at least one of the environmental condition information or the characteristic information to a communication system of a vehicle.

BRIEF DESCRIPTION OF THE DRAWINGS

The present description will be understood more fully from the detailed description given below and from the accompanying drawings of various embodiments of the present embodiment, which, however, should not be taken to limit the present embodiment to the specific embodiments, but are for explanation and understanding only.

DETAILED DESCRIPTION

Figure 1A:
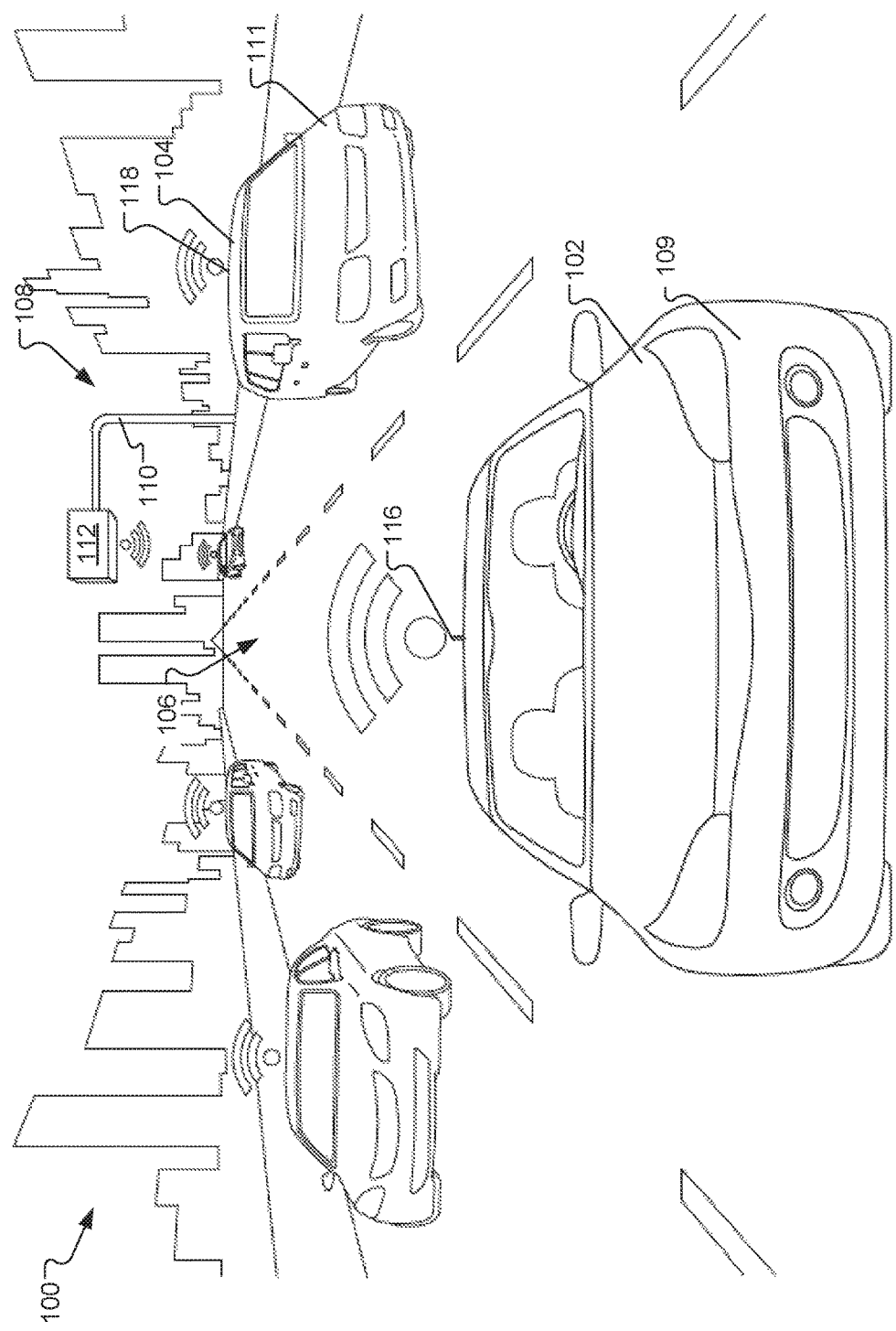
FIG. 1A shows an autonomous vehicle system with autonomous vehicles traveling along a pathway and a sensor assistance system, according to an embodiment.

The disclosed autonomous vehicle assistance systems will become better understood through a review of the following detailed description in conjunction with the figures. The detailed description and figures provide merely examples of the various embodiments described herein. Those skilled in the art will understand that the disclosed examples may be varied, modified, and altered without departing from the scope of the embodiments described herein. Many variations are contemplated for different applications and design considerations; however, for the sake of brevity, each and every contemplated variation is not individually described in the following detailed description.

Throughout the following detailed description, examples of various autonomous vehicle assistance systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Autonomous vehicles are configured to navigate through an environment with little or no input from a driver. In one example, an autonomous vehicle may navigate a roadway of transportation system between a starting point and an ending point. In another example, the autonomous vehicle may navigate an off-road path. The roadway or off-road path may have objects, obstacles, or rules that vehicles must follow when traversing the roadway or off-road path. For example, when the autonomous vehicle is traveling along a roadway, the autonomous vehicle may have to avoid other vehicles, stay within a designated lane for the vehicle, and obey other law and rules for vehicles traveling on the roadway. Similarly, when the autonomous vehicle travels off-road, the autonomous vehicle may avoid obstacles and may stay on a designated off-road path to avoid dangers.

Conventionally, an autonomous vehicle has a control system that controls one or more of the systems or subsystems of the autonomous vehicle. For example, the control system may include a steering system, a braking system, a transmission system, and a throttle system. To travel along the roadway and/or off-road path, the autonomous vehicle may include multiple sensors that the control system uses to take sensor measurements within an area surrounding the autonomous vehicle. The autonomous vehicle may use information from the sensor measurements to navigate through the roadway or off-road path, avoid collisions, and efficiently reach a destination. For example, when a processor uses the sensor measurements to identify an obstacle is a route of the autonomous vehicle, the processor and/or the control system may navigate around the obstacle to avoid a collision.

For example, based on one or more of sensor measurements, the control system may apply a brake, adjust the steering, accelerate, decelerate, and so forth. Conventionally, to avoid false data points, incomplete obstacle data, misidentification of objects, and incorrect vehicle movements, the autonomous vehicle may include a sensor array of different sensors. The conventional sensor array may be very extensive, combining a relatively large number of sensors located at multiple locations on the autonomous vehicle. The relatively large sensor array may be expensive and may be time-consuming to install. Additionally, the sensors of the sensor array may have a limited perspective and distance from the vehicle that they may take measurements. For example, the conventional autonomous vehicle sensors may only take measurements within a radius of 10-20 feet around the vehicle and may only take the measurements at the current location of the vehicle. In this example, the conventional autonomous vehicle sensors may not take measurements around a corner or more than 20 feet up the roadway or off-road path. The conventional autonomous vehicle is also limited to the sensors that may be integrated or attached to the conventional autonomous vehicle and is not upgradable after it is manufactured. The limited range, limited sensor perspective, necessity of a large sensor array, and the substantial cost of the sensor array may limit the viability of conventional autonomous vehicles as mass consumer products because the cost may be too expensive and the safety and reliability of the conventional autonomous vehicles may be unacceptable to a user.

The embodiments described herein may address the above-noted deficiencies by providing a sensor assistance system that may be located off of or apart from the autonomous vehicles. The sensor assistance system may include a sensor support structure configured to hold a sensor system above a roadway or an off-road path. The sensor system may include a sensor to capture a sensor measurement within an area of the path below the sensor system. The sensor system may also include a communication subsystem to receive vehicle information from one or more vehicles within a communication distance of the communication subsystem. The sensor system may also include a processing device coupled to the sensor and the communication subsystem. The processing device may determine at least one of environmental condition information within the area of the path below the sensor system or characteristic information associated with an object within the area of the path below the sensor system using the sensor measurement and/or the vehicle information. The processing device may use the communication subsystem to send the environmental condition information and/or the characteristic information to a communication system of one or more vehicles within the communication range of the communication subsystem. The sensor assistance system may provide a sensor system that may be used or shared by multiple autonomous vehicles. When multiple autonomous vehicles share the sensor assistance system, the cost of the sensor assistance system may be spread across multiple users, thereby reducing the cost to any given individual.

FIG. 1A shows an autonomous vehicle system 100 with autonomous vehicles 102 and 104 traveling along a pathway 106 with a sensor assistance system 108, according to an embodiment. The autonomous vehicle 102 may include a first sensor array 109 and the second autonomous vehicle 104 may include a second sensor array 111. The first and second sensor arrays 109 and 111 may include image sensors, optical sensors, cameras, light detection and ranging (LIDAR) sensors (also referred to as laser detection and ranging sensors), radio detection and ranging (RADAR) sensors, odometers, position sensors, location sensors, sound sensors, heat sensors, and so forth. The autonomous vehicle 102 may use the first sensor array 109 and the second autonomous vehicle 104 may use the second sensor array 111 to detect objects along the pathway 106. The pathway 106 may be a highway, freeway, road, off-road path, and so forth. For example, the autonomous vehicle 102 may use the first sensor array 109 to detect other cars, potholes, vehicle lanes, pathway, turns, stop lights, and so forth.

The level and type of the autonomous vehicles 102 and 104 may vary. In one example, the autonomous vehicles 102 and/or 104 may be level 1 autonomous vehicles, where most functions of the autonomous vehicles are still controlled by the driver, but a specific function like steering or acceleration can be done automatically by the autonomous vehicles. In another example, the autonomous vehicles 102 and/or 104 may be level 2 autonomous vehicles, where at least one subsystem of the steering and acceleration systems of the autonomous vehicles are automated, such as cruise control and lane-centering and the driver is still able to take control of the autonomous vehicles. In another example, the autonomous vehicles 102 and/or 104 may be level 3 autonomous vehicles, where the drivers are still in control if necessary, but the autonomous vehicles are able to completely shift safety-critical functions to the vehicle under defined traffic or environmental conditions. In another example, the autonomous vehicles 102 and/or 104 may be level 4 autonomous vehicles where the autonomous vehicles are fully autonomous and may perform all safety-critical driving functions and monitor roadway conditions for entire trips within defined driving scenarios. In another example, the autonomous vehicles 102 and/or 104 may be level 5 autonomous vehicles where the autonomous vehicles are fully autonomous, may drive in all driving scenarios, and may perform equal to or better than human drivers.

The autonomous vehicles 102 and 104 may include control systems that use measurements from the first sensor array 109 and the second sensor array 111, respectively, to identify how to maneuver and control the autonomous vehicles 102 and 104 based on the identified scene along the pathway 106. The first autonomous vehicle 102 may include a first communication system 116 and the second autonomous vehicle 104 may include a second communication system 118.

The control systems of the first autonomous vehicle 102 and the second autonomous vehicle 104 may use the first and second communication systems 116 and 118 to communicate with each other, other vehicles, and/or the sensor assistance system 108. For example, the sensor assistance system 108 may be an off-vehicle system to take measurements separate from the first sensor array 109 or the second sensor array 111.

The sensor assistance system 108 may include a sensor support structure 110 configured to hold a sensor system 112. In one example, the sensor support structure 110 may hold the sensor system 112 at approximately the same height as vehicles traveling along the pathway 106. In another example, the sensor support structure 110 may hold the sensor system 112 above a pathway 106. In one example, the sensor support structure 110 may hold the sensor system 112 at a height above the pathway 106 of approximately 10 meters (m). In another example, the sensor support structure 110 may hold the sensor system 112 at a height above the pathway between 10 m and 1000 m. In one embodiment, the sensor support structure 110 may hold the sensor system 112 above the pathway 106 at a height of 8 feet to 12 feet.

In another embodiment, the sensor support structure 110 may be a stop light pole, a street light pole, a billboard pole, and so forth. In another embodiment, the sensor support structure 110 may hold the sensor system 112 along a side or edge of the pathway 106. In another embodiment, the sensor support structure 110 may extend at least partially over the pathway 106 such that the sensor system 112 is located over top of at least a portion of the pathway 106. For example, the sensor support structure 110 may extend over a lane of the pathway 106 or over a middle of a multilane pathway 106. The sensor support structure 110 extending at least partially over the pathway 106 may provide the sensors of the sensor system 112 with an overview perspective of the pathway 106 to provide sensor measurements that may be unique and different from sensor measurements taken by the first sensor array 109 and the second sensor array 111.

The sensor system 112 may include image sensors, optical sensors, cameras (such as optical, day-light, and night vision cameras), LIDAR sensors, RADAR sensors, speed sensors, position sensors, location sensors, sound sensors, heat or temperature sensors, precipitation or weather sensors, wind sensors, humidity sensors, and so forth. The sensor system 112 may use the sensors to obtain scene information, such as environmental information, object information, movement information, and so forth. In one example, the environmental information may include temperature information, humidity information, weather condition information, wind speed information, roadway temperature information, roadway condition information, and so forth. In another example, the object information may include a location of a first object, a telemetry of the first object, a speed of the first object, a position of the first object, an identity or type of the first object, and so forth. In another example, the movement information may include information for a second object relative to a first object. In one embodiment, the movement information may include the location of the second object relative to the first object, the telemetry of the second object relative to the first object, the speed of the second object relative to the first object, a position of the second object relative to the first object, an identification or type of the second object relative to the first object, and so forth.

The communication subsystem may communicate with the autonomous vehicles 102 and 104 within communication range of the sensor assistance system 108. The communication subsystem may include an antenna to send and/or received data. The communication subsystem may send and/or receive the data using a communications network. In one embodiment, the communication subsystem may communicate with communication systems of the autonomous vehicles via a vehicle-to-vehicle (V2V) network, a vehicle-to-everything (V2X) network, a wireless network, a cellular network, and so forth. In one example, the communications network may be a close-range network, such as between 5.855-5.925 gigahertz (GHz) or 715-725 megahertz (MHz); an 802.11b/g/n/a/ad/ac/ax network (such as a Wi-Fi® network); a 2.4 to 2.485 GHz network (such as a Bluetooth® 1.0-5.0 network), an 802.15 network (such as a Zigbee® network). In another example, the communication subsystem may send raw or unanalyzed sensor data to the autonomous vehicles 102 and 104 and a processor onboard the autonomous vehicles 102 and 104 may process the sensor data. In another embodiment, a processing device of the sensor assistance system 108 may analyze the data from the sensors to determine scene information, such as environmental information, object information, movement information and the communication subsystem may communicate the environmental information, the object information, and/or the movement information to the autonomous vehicles 102 and 104.

The processing devices of the autonomous vehicles 102 and 104 may use the unanalyzed sensor data and/or the analyzed data to determine commands related to the operation of the autonomous vehicles 102 and 104. In one example, when the autonomous vehicles 102 and 104 receive environmental information from the sensor assistance system 108 indicating that the pathway 106 may be slippery or icy, the processing devices of the autonomous vehicles 102 and 104 may reduce the speed of the autonomous vehicles 102 and 104 or switch the autonomous vehicles 102 and 104 to all-wheel drive. In another example, when the autonomous vehicles 102 and 104 receive movement information from the sensor assistance system 108 indicating that the autonomous vehicle 102 is on a collision course with the autonomous vehicle 104, the processing devices of the autonomous vehicle 102 and/or the autonomous vehicle 104 may apply the brakes of a braking system or adjust a plotted route along the pathway 106 to avoid the collision.

The sensor assistance system 108 may also communicate information other than sensor information, such as speed limit information, traffic alert information, tourist information, and so forth. The sensor assistance system 108 may also relay information between the autonomous vehicle 102, the autonomous vehicle 104, and/or other vehicles.

In one example, the autonomous vehicle 102 and/or the autonomous vehicle 104 may integrate data received from the sensor assistance system 108 with data onboard the autonomous vehicle 102 and/or the autonomous vehicle 104 to update or adjust the data and information the processing devices of the autonomous vehicle 102 and the autonomous vehicle 104 use to control the autonomous vehicle 102 and the autonomous vehicle 104, respectively.

In another embodiment, a processing device of the sensor assistance system 108 may be coupled to the sensor system 112. The processing device may determine the scene information, such as environmental information, the object information, the movement information, and so forth, as discussed above. In one example, the processing device may determine the environmental condition information within the defined area of the pathway 106 below the sensor assistance system 108. In another example, the processing device may determine characteristic information associated with an object within the area of the pathway 106 below the sensor assistance system 108. The processing device may send the scene information to an autonomous vehicle using the communication subsystem of the sensor assistance system 108.

In one embodiment, the sensor assistance system 108 may use measurements from the sensor and/or information from the autonomous vehicles 102 and 104 to generate a two-dimensional (2D) description or a three-dimensional (3D) description of a scene approximate or surrounding the autonomous vehicles 102 and/or 104. In another example, the sensor assistance system 108 may send the measurements from the sensors and/or other information to the autonomous vehicles 102 and 104, and the processing systems of the autonomous vehicles 102 and 104 may generate the 2D description or 3D description of a scene approximate or surrounding the autonomous vehicles 102 and/or 104.

Figure 1B:
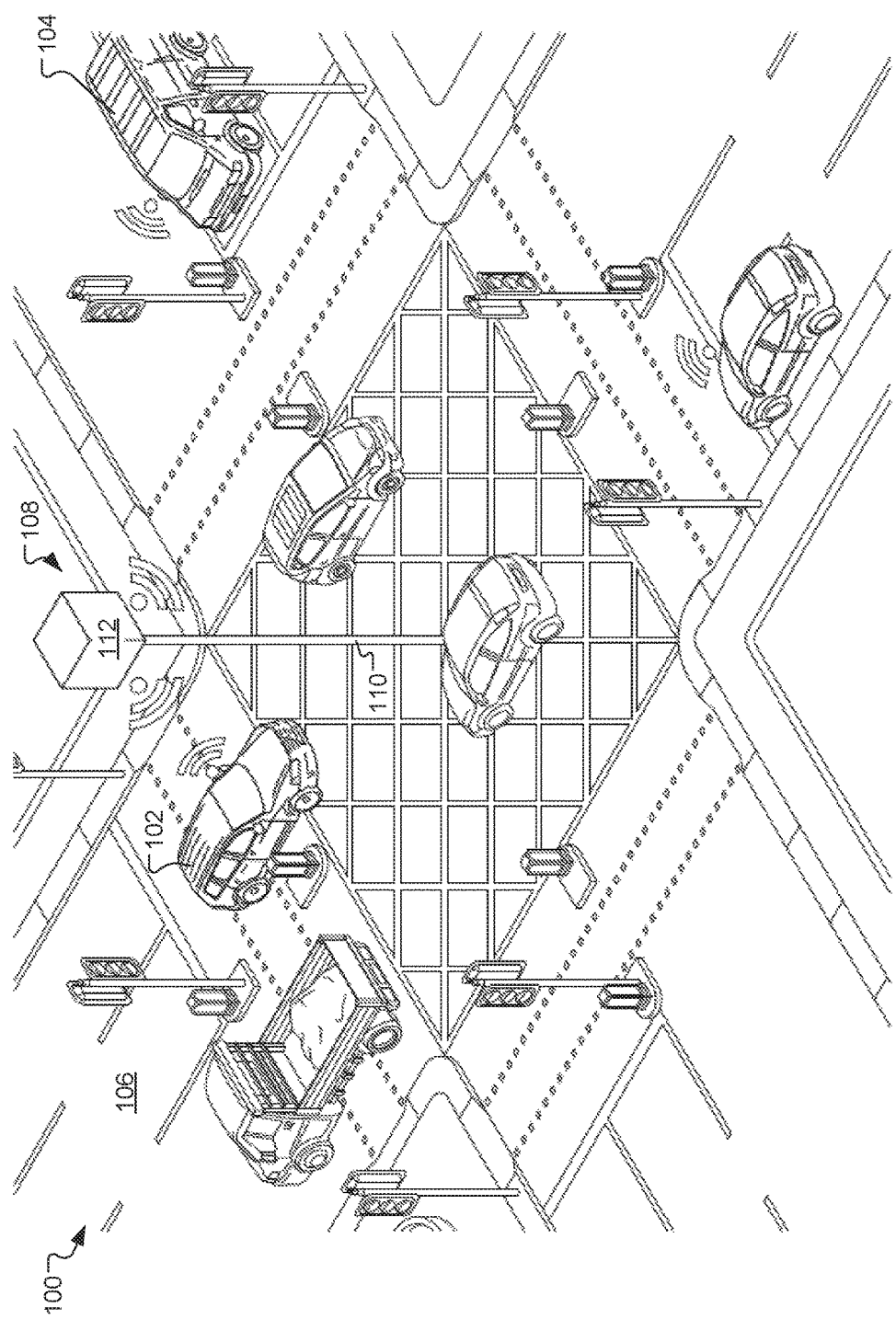
FIG. 1B shows the autonomous vehicle system with the autonomous vehicles traveling along the pathway and the sensor assistance system located at a junction along the pathway, according to an embodiment.

FIG. 1B shows the autonomous vehicle system 100 with the autonomous vehicles 102 and 104 traveling along the pathway 106 and the sensor assistance system 108 located at a junction along the pathway 106, according to an embodiment. Some of the features in FIG. 1B are the same or similar to some of the features in FIG. 1A as noted by same reference numbers, unless expressly described otherwise. As discussed above, the sensor assistance system 108 may be located alongside the pathway 106, where the sensor system 112 may overhang part of the pathway 106 or be located on a sensor support structure 110 approximate to the pathway 106. In another embodiment, the sensor assistance system 108 may be located at a junction of the pathway 106. In one example, the junction may be a 3-way intersection, a 4-way intersection, a 5-way intersection, and so forth. In another example, the junction may be a Y junction, a T junction, a round-about junction, a fork junction, an on-ramp, an off-ramp, and so forth. In one embodiment, the sensor assistance system 108 may be located at approximately the center of the junction. In one example, the sensor support structure 110 may be a pole at the center of the junction. In another example, the sensor support structure 110 may be a wire that spans a portion of the junction, where the sensor system 112 hangs from the wire. In another embodiment, the sensor assistance system 108 may be located at the edges or corners of the junction. For example, the sensor support structure 110 may be a pole or beam located at the edge or corner of the junction and the sensor system 112 may be attached to the top of the pole or beam.

The sensor assistance system 108 may be located at the junction of the pathway 106 because the junctions may be relatively complex and problematic locations along the pathway 106 with more objects and variables for the autonomous vehicles 102 and 104 to sense. For example, the junction may include multiple autonomous vehicles, non-autonomous vehicles, pedestrians, bikers, and animals going multiple directions within the junction. The sensors of the autonomous vehicles 102 and 104 may have a limited range and sensing perspective or angle to sense the various objects at the intersection. The sensor assistance system 108 may be located at the junction to provide additional sensor information to the autonomous vehicles 102 and 104 to enable the autonomous vehicles 102 and 104 to more accurately sense the objects at the junction.

Figure 1C:
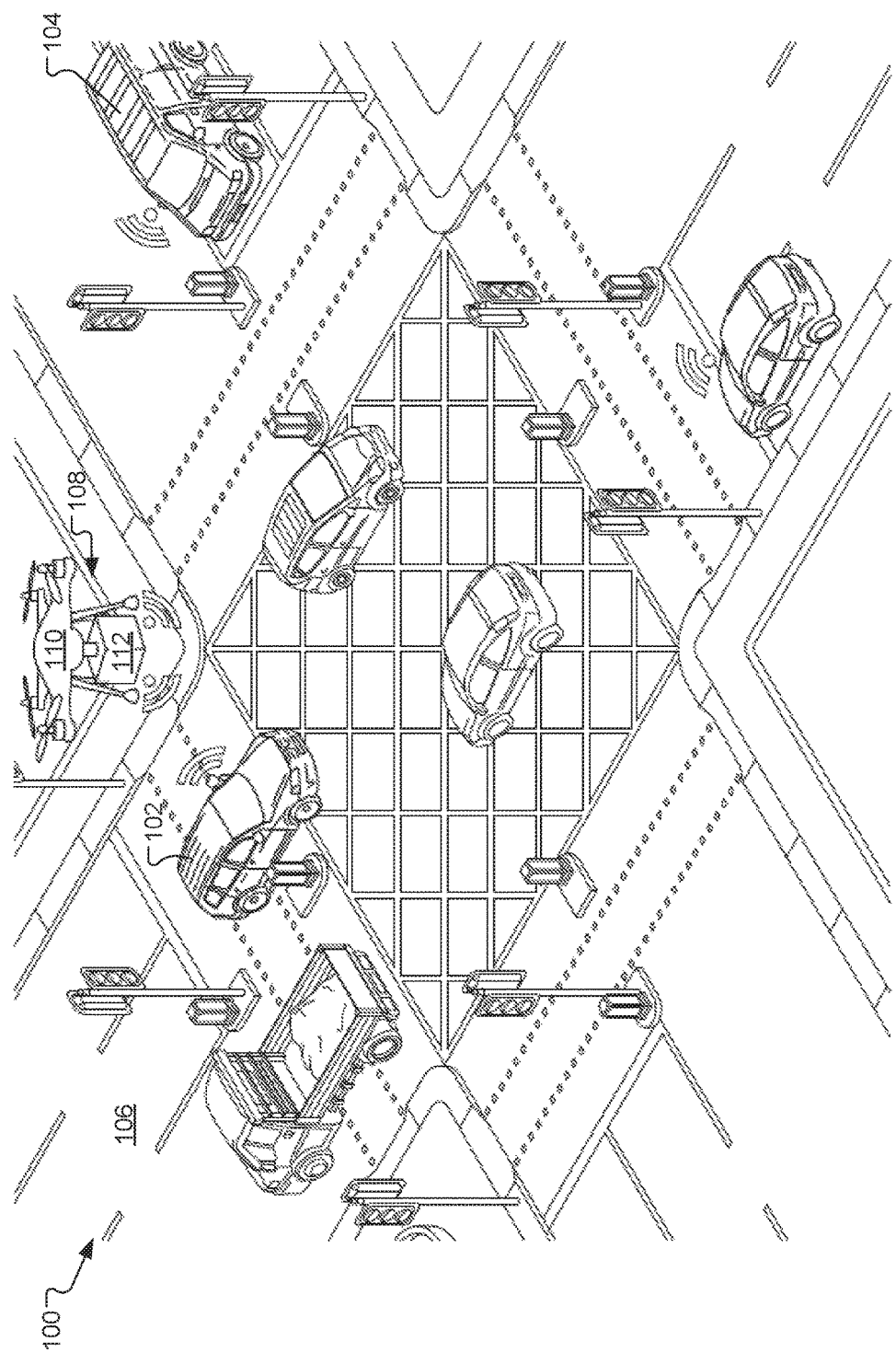
FIG. 1C shows the autonomous vehicle system with the autonomous vehicles traveling along the pathway and the sensor assistance system attached to sensor support structure that is an aerial vehicle above the pathway, according to an embodiment.

FIG. 1C shows the autonomous vehicle system 100 with the autonomous vehicles 102 and 104 traveling along the pathway 106 and the sensor assistance system 108 attached to a sensor support structure 110 that is an aerial vehicle above the pathway 106, according to an embodiment. Some of the features in FIG. 1C are the same or similar to some of the features in FIGS. 1A-B as noted by same reference numbers, unless expressly described otherwise. In one embodiment, the sensor support structure 110 may be an aerial vehicle. For example, the aerial vehicle may be a drone, an unmanned aerial vehicle (UAV), an unmanned aircraft system (UAS), and so forth. In one example, the aerial vehicle may be autonomous with an internal control system to direct the aerial vehicle to the desired location for a sensor assistance system 108. In another example, the aerial vehicle may be controlled by an individual to direct the aerial vehicle to the desired location for the sensor assistance system 108.

In one embodiment, the aerial vehicle may change the location of the sensor system 112 based on instructions from an individual or an internal control system. For example, the aerial vehicle may change its location when the weather changes, when there is a change in a traffic pattern along the pathway 106, when there is a change in the amount of traffic along the pathway 106, when there is an accident along the pathway 106, and so forth. In another embodiment, the aerial vehicle may change a height the sensor system 112 is located above the pathway 106. For example, the aerial vehicle may change its distance from the surface of the pathway 106 when the weather changes, when there is a change in a traffic pattern along the pathway 106, when there is a change in the amount of traffic along the pathway 106, when there is an accident along the pathway 106, and so forth. For example, when the weather is windy, rainy, or snowy, the aerial vehicle may change is location or distance from the surface of the pathway 106 so that the aerial vehicle may continue to remain aerial. In another example, when a traffic accident is detected within a defined range of the current location of the aerial vehicle, the aerial vehicle may change is location and/or distance from the surface of the pathway 106 to provide additional information regarding the traffic accident to the autonomous vehicles 102 and 104

Figure 2:
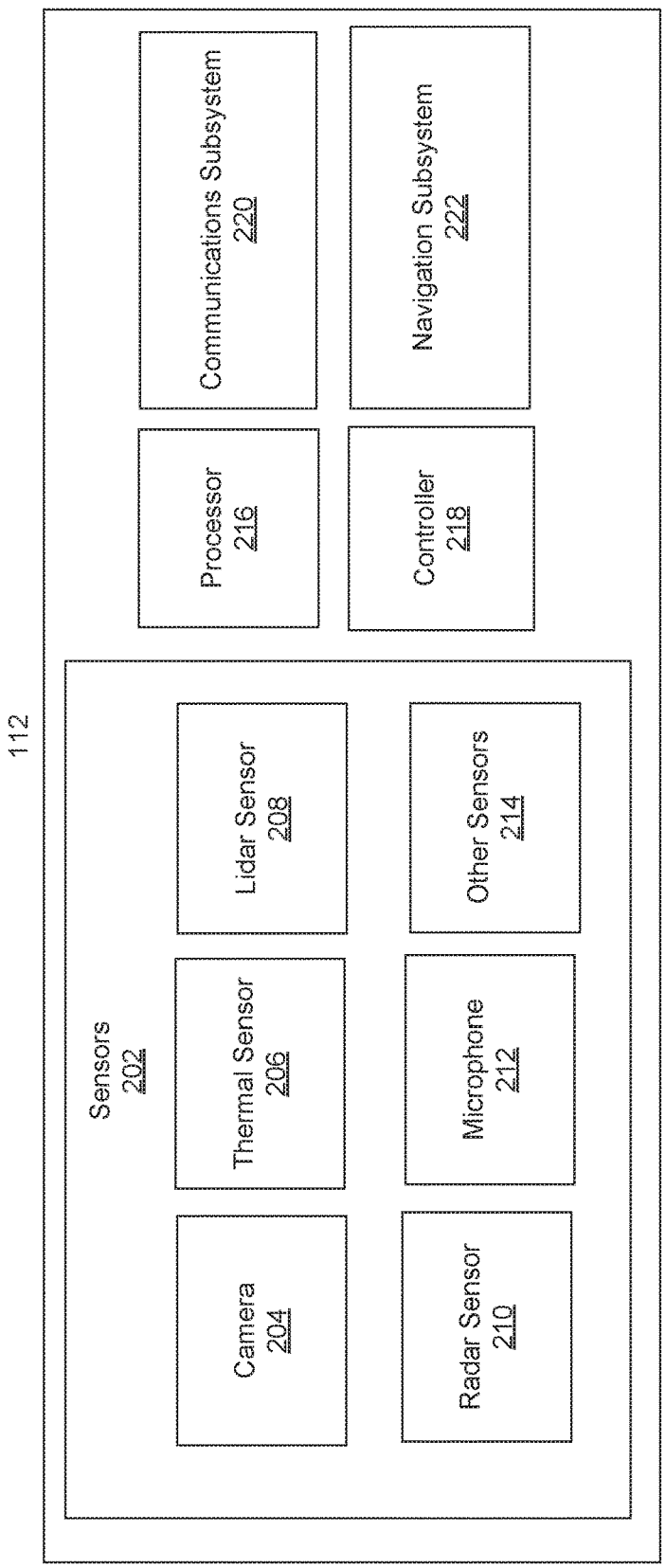
FIG. 2 shows the sensor system with a sensor, a processor, a controller, a communications subsystem, and a navigation subsystem, according to an embodiment.

FIG. 2 shows the sensor system 112 with a sensor 202, a processor 216, a controller 218, a communications subsystem 220, and a navigation subsystem 222, according to an embodiment. Some of the features in FIG. 2 are the same or similar to some of the features in FIGS. 1A-C as noted by same reference numbers, unless expressly described otherwise.

In one embodiment, the sensor 202 may include at least one of a camera (204), a thermal sensor (206), a LIDAR sensor (208), a RADAR sensor (210), a microphone (212), or other sensors (214). The camera 204 may be a day-light camera, a night-vision camera, an optical camera, an infrared camera, and so forth. The thermal sensor 206 may be a thermal imaging camera, a thermistor, a thermometer, a temperature gauge, and so forth. The microphone 212 may be a diaphragm microphone, a dynamic microphone, a condenser microphone, a ribbon microphone, a boundary microphone, and so forth. The other sensors 214 may include other sensors used to detect objects, surface conditions, environmental sensors, weather sensors, and so forth.

The processor 216 may be coupled to the sensors 202 and/or the controller 218. In one embodiment, the processor 216 may analyze information and data from the sensors. For example, the processor 216 may analyze the information and data from the sensors to identify the types of objects within the range of the sensors, determine a velocity or direction of the objects, determine conditions of the pathway 106 in FIGS. 1A-C, and so forth.

The controller 218 may be coupled to the sensors 202 and/or the processor 216. In one example, the controller 218 may control or adjust one or more settings of the sensors 202. For example, the controller 218 may control a focus setting, shutter setting, or zoom setting of the camera 204. In another example, the controller 218 may control or adjust a function or tuning parameter of the sensors 202. For example, when the sensor system 112 is connected to the aerial drone, as discussed above, as the aerial drone changes location or distance from the surface of the pathway 106 in FIGS. 1A-C, the controller 218 may adjust one or more settings of the sensors 202.

In one embodiment, the controller 218 may be a single controller that controls the sensors 202. In another embodiment, the controller 218 may be multiple controllers that each control different sensors. In another embodiment, the multiple controllers may be dedicated controllers to adjust the sensors to detect different types of information, such as environmental information, weather information, object information, traffic information, and so forth.

When the sensor support structure 110 is an aerial vehicle, the controller 218 may control the aerial vehicle. For example, the controller 218 may control the location, speed, distance from the surface of the pathway 106, an angle of flight, and so forth of the aerial vehicle. The controller 218 may also monitor the battery life of a power source of the aerial vehicle and when the battery life remaining decreases below a threshold level, the controller 218 may navigate the aerial vehicle to a charging station or a location to receive a new power source. In one embodiment, the controller 218 may be coupled to the navigation subsystem 222. The navigation subsystem 222 may provide the controller 218 and/or the processor 216 with location information that the controller 218 and/or the processor 216 may use when controlling the flight of the aerial vehicle. For example, the navigation subsystem 222 may include a global positioning system (GPS) that may use multiple satellite signals to determine a position of the aerial vehicle as well as determine the surrounding landmarks and environment. The navigation subsystem may also generate a two dimensional (2D) or three dimensional (3D) map of the area surrounding the aerial vehicle that the controller 218 and/or the processor 216 may use to navigate the aerial vehicle.

The communications subsystem 220 may be coupled to the processor 216. The communications subsystem 220 may send or receive data or information with other devices. For example, the communications subsystem 220 may send or receive data with a communications system of an autonomous vehicle, another sensor assistance system, a base station, and so forth. The communication subsystem 220 may communicate with the other devices via a vehicle to vehicle (V2V) network, a wireless network, wireless local area network (WLAN), a local area network (LAN), a wide area network (WAN), a cellular network, and so forth. In one example, the communications network may be a close-range network, such as between 5.855-5.925 gigahertz (GHz) or 715-725 megahertz (MHz); an 802.11b/g/n/a/ad/ac/ax network (such as a Wi-Fi® network); a 2.4 to 2.485 GHz network (such as a Bluetooth® 1.0-5.0 network), an 802.15 network (such as a Zigbee® network), a vehicle to everything network (V2X), an ITS-GS network, and so forth. In another example, the communications network may be a second generation (2G) cellular network, a third-generation (3G) cellular network, a fourth generation (4G) cellular network, a fifth generation (5G) cellular network, and so forth. The communications network may be for a long distance communication system to connect to a base station, a headquarters, a traffic control center, and so forth.

Figure 3A:
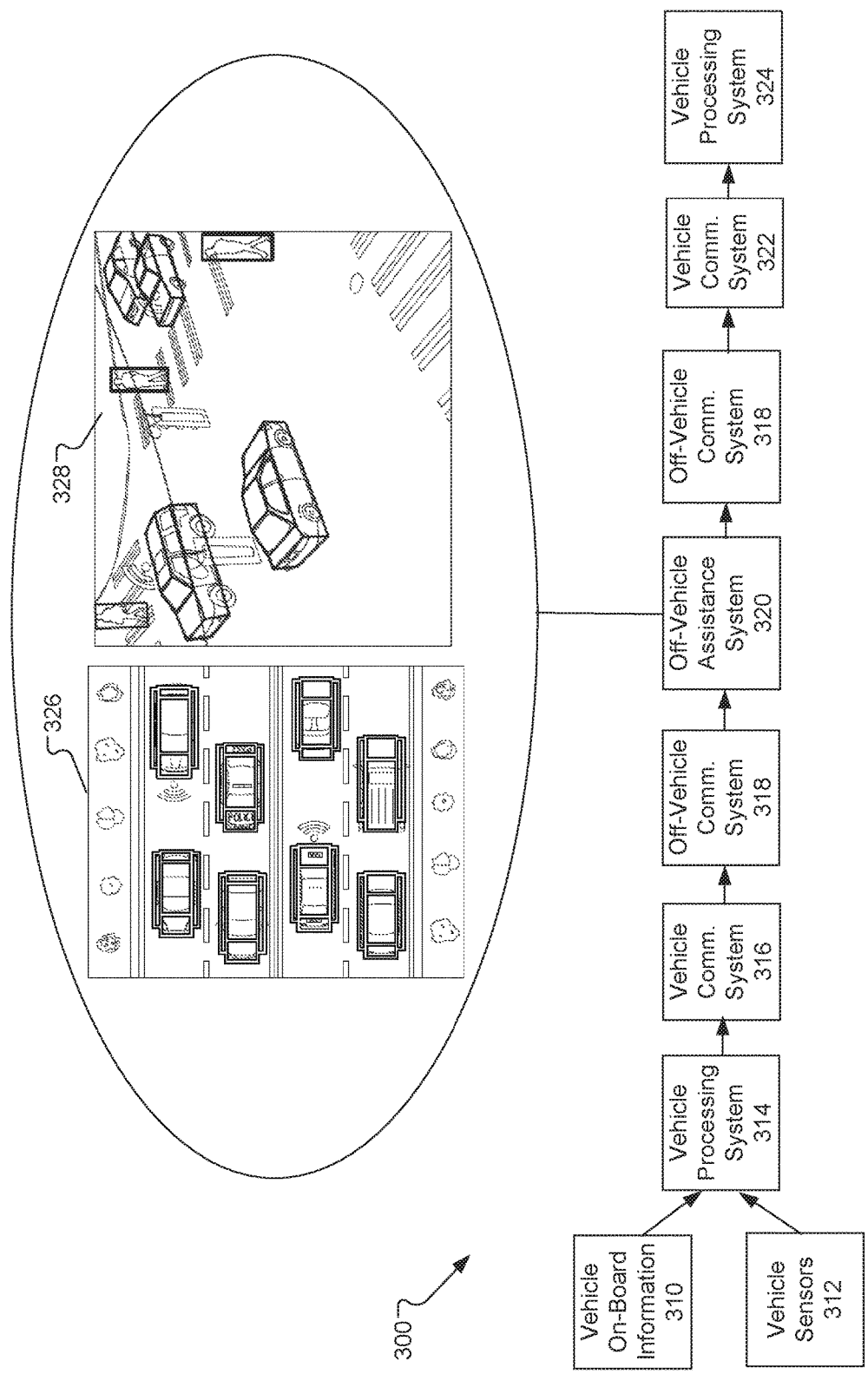
FIG. 3A shows a flowchart for an autonomous vehicle communicating with the sensor assistance system in FIG. 1, according to an embodiment.

FIG. 3A shows a flowchart 300 for an autonomous vehicle communicating with an off-vehicle assistance system 320 in FIG. 1, according to an embodiment. The autonomous vehicle may store vehicle onboard information 310, such as the type of vehicle, the mileage of the vehicle, the level of autonomy of the vehicle, the processing capabilities of the vehicle, and so forth. In one example, the vehicle onboard information 310 may be used by the off-vehicle assistance system 320 and/or the vehicle processing system 324, as discussed below, to improve the accuracy of the scene description that it generates. The off-vehicle assistance system 320 and/or the vehicle processing system 324 may improve the accuracy because the off-vehicle assistance system 320 and/or the vehicle processing system 324 may adjust or customize the scene information based on the information about the autonomous vehicle. For example, when the vehicle is a large truck, the off-vehicle assistance system 320 and/or the vehicle processing system 324 may adjust or customize the scene information for the large truck rather than a small car. The off-vehicle assistance system 320 may be the sensor assistance system 108 in FIGS. 1A-1C.

The autonomous vehicle may also capture sensor information using vehicles sensors 312. The vehicle processing system 314 for the autonomous vehicle may retrieve vehicle onboard information and/or receive the sensor information from the vehicle sensors 312. The vehicle processing system 314 may analyze the vehicle onboard information and/or the sensor information to determine scene information. For example, vehicle sensors 312 may constantly capture the scene information within a sensor radius of the autonomous vehicle. The sensor radius may be a radius where the vehicle sensors may collect reliable and usable information. A vehicle communication system may send the raw or analyzed vehicle onboard information and sensor information to the off-vehicle communication system 318 of the off-vehicle assistance system 320. The off-vehicle communication system 318 may be coupled to a processing device of an off-vehicle assistance system 320 and the off-vehicle communication system 318 may send the raw or analyzed vehicle onboard information and sensor information to the processing device 20. The off-vehicle assistance system 320 may also include a sensor system with sensors to capture scene information within a sensor radius of the off-vehicle assistance system 320. For example, when the off-vehicle assistance system 320 is located above the pathway of the autonomous vehicle, the off-vehicle assistance system 320 may periodically or continuously capture the scene information within a sensor radius of the sensors of the off-vehicle assistance system 320.

In one embodiment, the off-vehicle assistance system 320 may aggregate the onboard information and/or sensor information from the autonomous vehicle and the sensor information from the sensors of the off-vehicle assistance system 320 to determine updated scene information, such as environmental condition information and characteristic information. In another embodiment, the updated scene information may only include the sensor information from the sensors of the off-vehicle assistance system 320. In another embodiment, the off-vehicle assistance system 320 may analyze the sensor information from the sensors of the off-vehicle assistance system 320 to determine updated scene information. In another embodiment, the vehicle processing system 324 may receive unanalyzed or raw data from the off-vehicle assistance system 320, and the vehicle processing system 324 may analyze the unanalyzed or raw data from the off-vehicle assistance system 320 to determine updated scene information. In one example, the updated scene information may be scene information that is more accurate than the onboard information and sensor information from the autonomous vehicle or the sensor information from the sensors of the off-vehicle assistance system 320 separately. In another example, the updated scene information may be a 2D description 326 or a 3D description 328 of the scene and the objects on the pathway.

The off-vehicle communication system 318 may send the updated scene information to a vehicle communication system 322. In one embodiment, the vehicle communication system 322 may be the same as the vehicle communication system 316. In another embodiment, the vehicle communication system 322 may be for a different autonomous vehicle.

The vehicle processing system 324 may use the updated scene information to determine the scene surrounding the autonomous vehicle. In one embodiment, the vehicle processing system 324 may be the same as the vehicle processing system 314. In another embodiment, the vehicle processing system 324 may be for a different autonomous vehicle.

The vehicle processing system 324 may adjust the control instructions that control the autonomous vehicle in view of the updated scene information. For example, when the update scene information indicates that there is an object, such as a bike, in front of the autonomous vehicle, the vehicle processing system 324 may adjust a route of the autonomous vehicle to avoid the object. In another example, the updated scene information may include information not initially detected by the vehicle sensors 312, such as an object that is out of range of the vehicle sensors 312. When the vehicle processing system 324 receives the updated scene information, the vehicle processing system 324 may adjust a route, velocity, direction, and so forth of the autonomous vehicle.

Figure 3B:
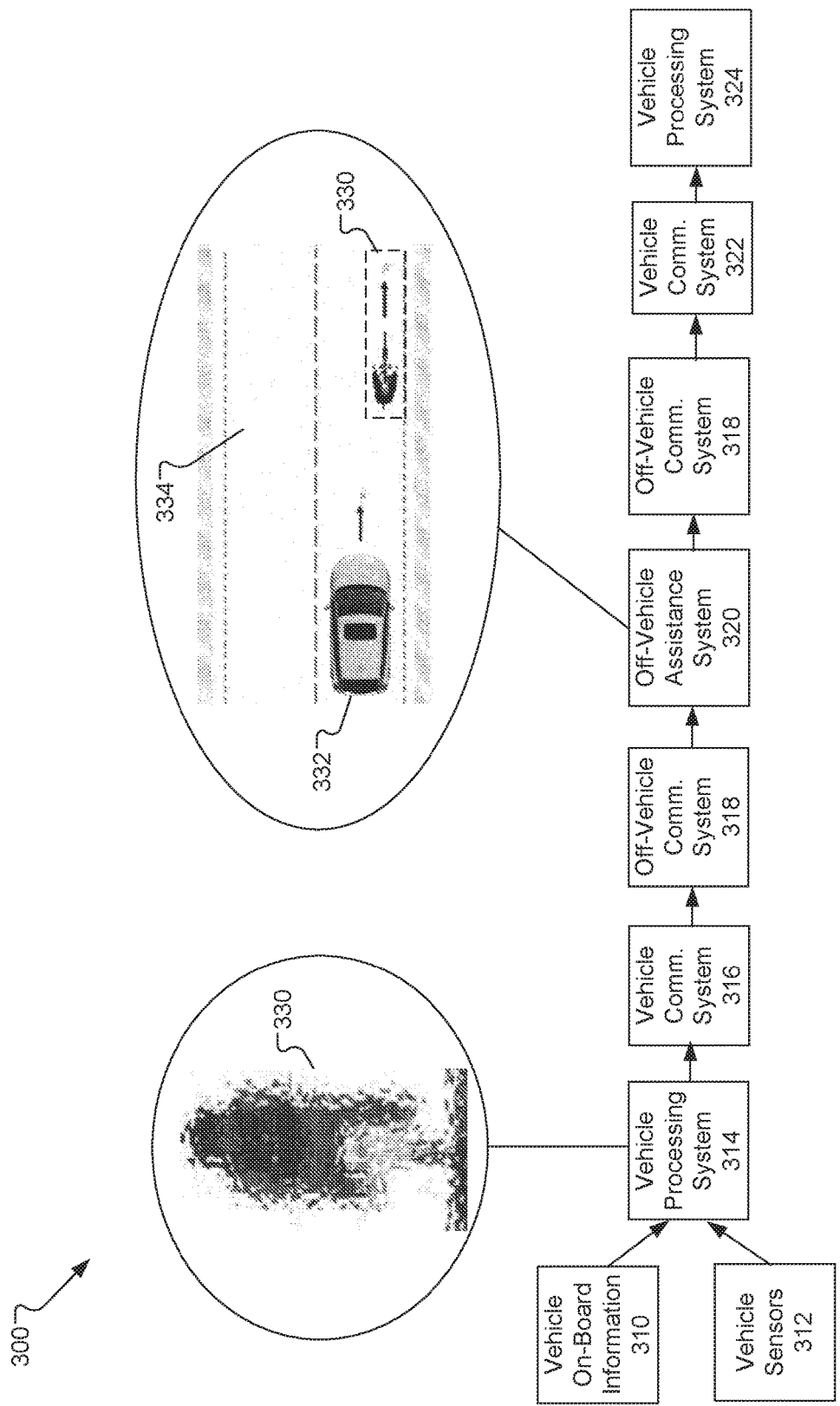
FIG. 3B shows the flowchart in FIG. 3A for the autonomous vehicle communicating with the sensor assistance system in FIG. 1, according to an embodiment.

FIG. 3B shows the flowchart 300 in FIG. 3A for the autonomous vehicle communicating with the off-vehicle assistance system 320 in FIG. 3A, according to an embodiment. Some of the features in FIG. 3B are the same or similar to some of the features in FIG. 3A as noted by same reference numbers, unless expressly described otherwise.

As discussed above, the vehicle processing system 314 may use the vehicle sensors 312 to make sensor measurements to detect objects within a measurement radius of the vehicle sensors 312. The vehicle processing system 314 may detect an object 330 using the sensor measurements. In one embodiment, the vehicle processing system 314 may not be able to identify what the object 330 is. For example, the vehicle processing system 314 may detect a general shape or form of the object 330, but interference may obscure the exact form or shape of the object 330. For example, when the vehicle sensor 312 is an optical camera and it is raining heavily around the autonomous vehicle, the optical camera may detect a general shape of the object 330, but the rain may interfere with an exact identification of the object 330. The off-vehicle assistance system 320 may be able to use the sensors of the off-vehicle assistance system 320 to take sensor measurements of the object 330 at a different angle, height, or perspective and/or using different sensors than the vehicle sensors 312.

The processing device of the off-vehicle assistance system 320 or the vehicle processing system 324 may be able to use the measurements from the sensors of the off-vehicle assistance system 320 to more accurately identify the object. In one example, the processing device of the off-vehicle assistance system 320 or the vehicle processing system 324 may aggregate the sensor measurements from the vehicle sensors 312 and the sensors of the off-vehicle assistance system 320 to identify the object 330. In another example, the processing device of the off-vehicle assistance system 320 or the vehicle processing system 324 may only use the sensor measurements from the sensors of the off-vehicle assistance system 320 to identify the object 330. In one example, the object 330 may be a bicyclist along the pathway 334 of the autonomous vehicle 332. In one embodiment, the processing device of the off-vehicle assistance system 320 or the vehicle processing system 324 also use the sensor measurements from the vehicle sensors 312 and the sensors of the off-vehicle assistance system 320 to determine a speed, velocity, direction, size, shape, and so forth of the object 330. In another embodiment, the processing device of the off-vehicle assistance system 320 or the vehicle processing system 324 also use the sensor measurements from the vehicle sensors 312 and the sensors of the off-vehicle assistance system 320 to generate a two-dimensional image or a three-dimensional image of the autonomous vehicle 332 and the object 330.

In one example, the vehicle sensor 312 may capture a 2D camera image or series of camera images from the autonomous vehicle 332 that are vertical cross sections of the object 330 on the pathway 334 in front of the autonomous vehicle 332. It may be difficult for the vehicle processing system 314 to identify the object 330 from this position of the autonomous vehicle 332, especially when bad weather and rain interfere with the measurement by the vehicle sensors 312 of the object 330. When the vehicle processing system 314 may not identify the object 330, the vehicle processing system may request additional sensor information from the off-vehicle assistance system 320. The off-vehicle assistance system 320 may use an optical camera to capture another set of a 2D camera image or series of camera images that provide a horizontal cross-section of the object 330. The off-vehicle assistance system 320 and/or the vehicle processing system 314 or 324 may use the other set of a 2D camera image or series of camera images to more effectively and accurately identify the object 330 and characteristic of the object 330, such as a speed, velocity, direction, shape, or size of the object 330. In one embodiment, the off-vehicle assistance system may analyze sensor data from the vehicle sensors 312 and/or the sensors of the off-vehicle assistance system 320 at a higher speed and more accuracy than the vehicle processing system 314 because the processing device of the off-vehicle assistance system may not be limited in size or processing power like the vehicle processing system 314 is to fit within the autonomous vehicle 332.

Figure 4:
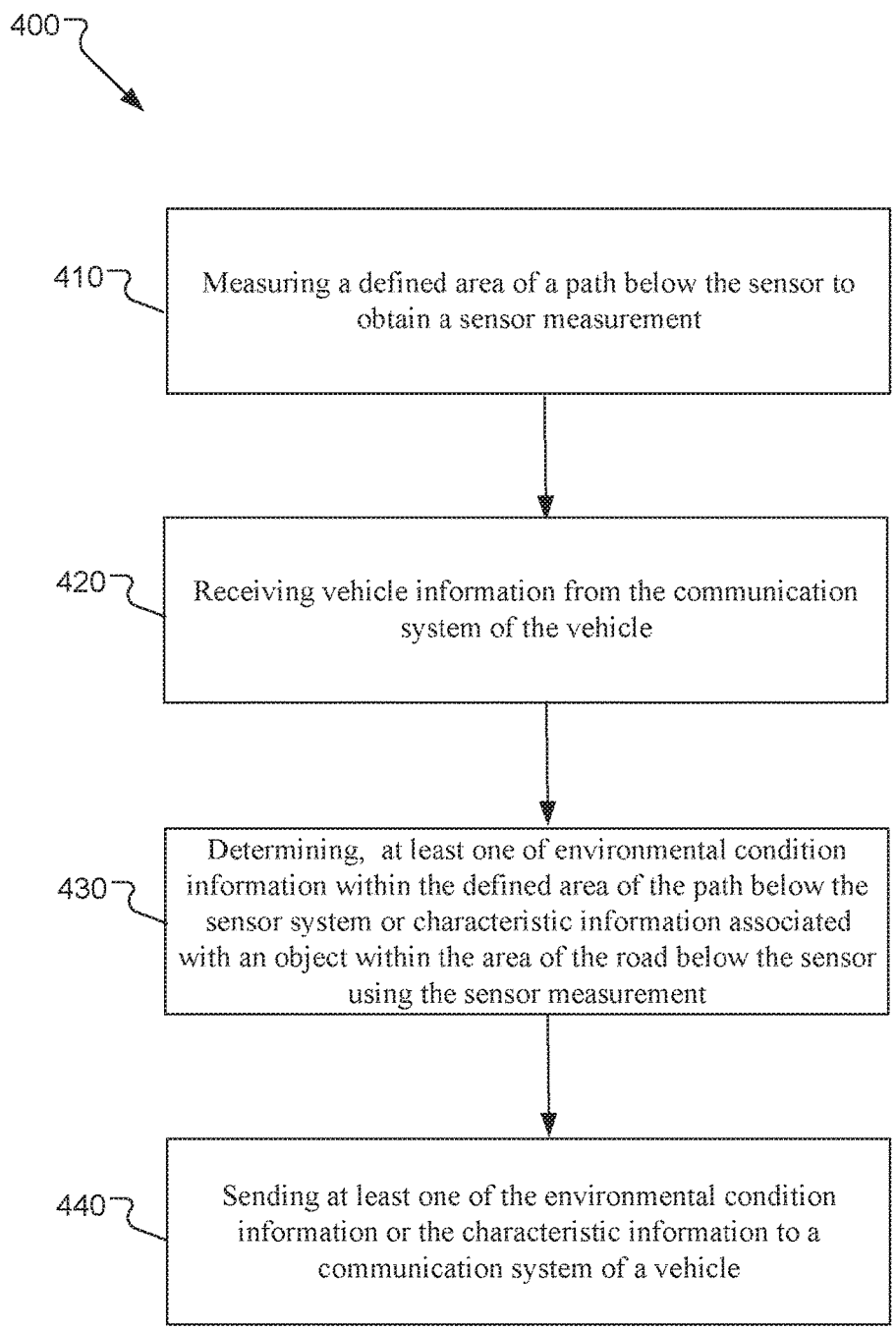
FIG. 4 illustrates a method for sending environmental condition information or characteristic information to a vehicle, according to an embodiment.

FIG. 4 illustrates a method 400 for sending environmental condition information or characteristic information to a vehicle, according to an embodiment. The method 400 may be implements on one or more of a processing device, a central processing unit (CPU), a microcontroller, a field programmable gate array, or other types of processors. The method may begin with measuring, by a sensor, a defined area of a path below the sensor to obtain a sensor measurement (block 410). In one embodiment, the sensor may be located above a side of the path or within an area defined as the path. The method may include receiving, by a communication subsystem, vehicle information from the communication system of the vehicle (block 420). The method may include determining, by a processing device, at least one of environmental condition information within the defined area of the path below the sensor system or characteristic information associated with an object within the area of the road below the sensor using the sensor measurement (block 430). The method may include sending, by the communication subsystem, at least one of the environmental condition information or the characteristic information to a communication system of a vehicle (block 440). In one embodiment, the vehicle may include an autonomous driving system to receive the environmental condition information or the characteristic information. The autonomous driving system may update a driving instruction for the vehicle in view of the environmental condition information or the characteristic information.

The disclosure above encompasses multiple distinct embodiments with independent utility. While each of these embodiments has been disclosed in a particular form, the specific embodiments disclosed and illustrated above are not to be considered in a limiting sense as numerous variations are possible. The subject matter of the embodiments includes all novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and sub-combinations of the disclosed embodiments that are believed to be novel and non-obvious.

Embodiments embodied in other combinations and subcombinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. A sensor assistance system, comprising:
a sensor support structure configured to hold a sensor system above a roadway at a defined height; and
the sensor system connected to the sensor support structure, the sensor system comprising:
a first sensor to capture a first sensor measurement within a defined area of the road below the sensor system;
a communication subsystem to receive vehicle information from a vehicle wherein the vehicle information indicates at least one of a type of the vehicle or a capability of the vehicle; and
a processing device coupled to the first sensor and the communication subsystem, the processing device to:
receive a second sensor measurement taken by a second sensor of the vehicle, wherein:
the second sensor is a different type of sensor than the first sensor; and
the second sensor measurement indicates there is an object within the defined area of the road, wherein the defined area is an area below the sensor system;
determine that the second sensor measurement includes interference that obscures identification of the object based on the second sensor measurement;
aggregate the first sensor measurement from the first sensor with the second sensor measurement from the second sensor to obtain aggregated sensor information;
generate a scene description of an area approximate the vehicle that includes the object based on the aggregated sensor information, wherein an accuracy of the scene description is increased when based on the aggregated sensor information;
adjust the scene description based on the vehicle information; and
send the scene description to a communication system of the vehicle.

2. The sensor assistance system of claim 1, wherein the processing device is further to generate a two-dimensional image or a three-dimensional image of the object using the aggregated sensor information.

3. The sensor assistance system of claim 1, wherein the processing device is further to generate a two-dimensional image or a three-dimensional image of an environment within the defined area using the aggregated sensor information.

4. The sensor assistance system of claim 1, wherein the processing device is further to generate a two-dimensional image or a three-dimensional image of an environment within the defined area that includes the object using the aggregated sensor information.

5. The sensor assistance system of claim 1, wherein the first sensor is a day-light camera, a night-vision camera, a light detection and ranging (LIDAR) sensor, a radio detection and ranging (RADAR) sensor, or a microphone.

6. The sensor assistance system of claim 1, wherein the first sensor measurement includes information that is different than information from the second sensor measurement.

7. The sensor assistance system of claim 1, wherein the sensor support structure is a street light pole, a stop light pole, or a billboard pole.

8. The sensor assistance system of claim 1, wherein the sensor support structure is an aerial drone.

9. A sensor system, comprising:
a first sensor to measure a defined area of a path located below the sensor system to obtain a first sensor measurement;
a processor coupled to the first sensor, the processor to:
receive a second sensor measurement taken by a second sensor of a first vehicle, wherein:
the second sensor is a different type of sensor than the first sensor;
the second sensor measurement indicates there is an object within the defined area of a road, wherein the defined area is an area below the sensor system;
determine that the second sensor measurement includes interference that obscures identification of the object based on the second sensor measurement;
aggregate the first sensor measurement from the first sensor with the second sensor measurement from the second sensor to obtain aggregated sensor information; and
generate a scene description of an area approximate the first vehicle that includes the object based on the aggregated sensor information, wherein an accuracy of the scene description is increased when based on the aggregated sensor information; and
a communication subsystem coupled to the processor, the communication subsystem to send the scene description to a first communication system of the first vehicle.

10. The sensor system of claim 9, further comprising a sensor support structure configured to hold the sensor system above the path at a defined height.

11. The sensor system of claim 10, wherein the defined height is between 10 meters (m) to 1000 m above the path.

12. The sensor system of claim 9, wherein the path is a road that is part of a transportation system for the first vehicle.

13. The sensor system of claim 9, the communication subsystem to receive first vehicle information from the first vehicle and second vehicle information from a second vehicle.

14. The sensor system of claim 13, wherein the processor is further to update scene description using the second vehicle information.

15. The sensor system of claim 14, wherein the communication subsystem is to send the updated scene description to at least one of the first communication system of the first vehicle or a second communication system of the second vehicle.

16. A method, comprising:
measuring, by a first sensor, a defined area of a path below a sensor to obtain a first sensor measurement;
receiving, by a processing device, a second sensor measurement taken by a second sensor of a vehicle, wherein:
the second sensor is a different type of sensor than the first sensor; and the second sensor measurement indicates there is an object within the defined area of a road, wherein the defined area is an area below the sensor system;

determining, by the processing device, that the second sensor measurement includes interference that obscures identification of the object based on the second sensor measurement;

aggregating, by the processing device, the first sensor measurement from the first sensor with the second sensor measurement from the second sensor to obtain aggregated sensor information;

generating, by the processing device, a scene description of an area approximate the vehicle that includes the object based on the aggregated sensor information; and sending, by a communication subsystem, the scene description to a communication system of the vehicle.

17. The method of claim 16, further comprising receiving, by the communication subsystem, vehicle information from the communication system of the vehicle.

18. The method of claim 17, wherein:
the vehicle comprise an autonomous driving system; and
the autonomous driving system is to update a driving instruction for the vehicle in view of the scene description.

19. The sensor system of claim 13, wherein the processor is further to adjust the scene description based on the first vehicle information.

20. The method of claim 17, wherein the processing device is further to adjust the scene description based on the vehicle information.

* * * * *